Sept. 24, 1957 S. SINGER ET AL 2,807,723

HIGH POWER PULSED OSCILLATOR

Filed Sept. 21, 1955 2 Sheets-Sheet 1

WITNESSES:

A. Fredrick Asmann
Robert D. Krohn

INVENTOR.
Leland K. Neher
Sidney Singer
BY
Roland A. Anderson
Attorney

Sept. 24, 1957 S. SINGER ET AL 2,807,723

HIGH POWER PULSED OSCILLATOR

Filed Sept. 21, 1955 2 Sheets-Sheet 2

WITNESSES:

A. Fredrick Hamann

Robert D Krohn

INVENTORS

Leland K. Neher

Sidney Singer

BY Roland A. Anderson

Attorney

United States Patent Office 2,807,723
Patented Sept. 24, 1957

2,807,723

HIGH POWER PULSED OSCILLATOR

Sidney Singer, Urbana, Ill., and Leland K. Neher, Los Alamos, N. Mex., assignors to the United States of America as represented by the United States Atomic Energy Commission Application September 21, 1955, Serial No. 535,770

7 Claims. (Cl. 250—36)

The present invention relates to pulse oscillators, and more particularly to high power, radio frequency pulse oscillators.

Many forms of radio frequency oscillators are available in the prior art. In general, however, no simple oscillator generator is available for generating high power trains of oscillations in response to input direct voltage impulses, or pulses of illumination.

An object of this invention is to provide a high gain device for producing radio frequency pulsed oscillations in a simple and economical manner.

Another object of this invention is to provide an apparatus for generating high-powered radio frequency pulsed oscillations in a simple and economical manner utilizing a single multidynode electron tube as the oscillator.

Another object of this invention is to provide a device for producing high-powered radio frequency pulsed oscillations in a simple and economical manner using a photo-multiplier tube as an oscillator tube.

An additional object of this invention is to provide an oscillator for generating trains of oscillations and which eliminates the need for a filament.

Still another object of this invention is to provide a single generator for producing trains of oscillations in response to illumination impulses.

Further objects of this invention will become apparent from the specifications and claims which include a preferred embodiment of the invention, and from the drawings, hereby made a part of the specification wherein:

The above and other objects are accomplished by the use of a multiplier-type tube having a cathode, a plurality of dynodes, an anode, and resistor means connected between each adjacent pair of dynodes, input terminal means coupled to the cathode, and output terminal means coupled to the last dynode.

Figures 1, 3:
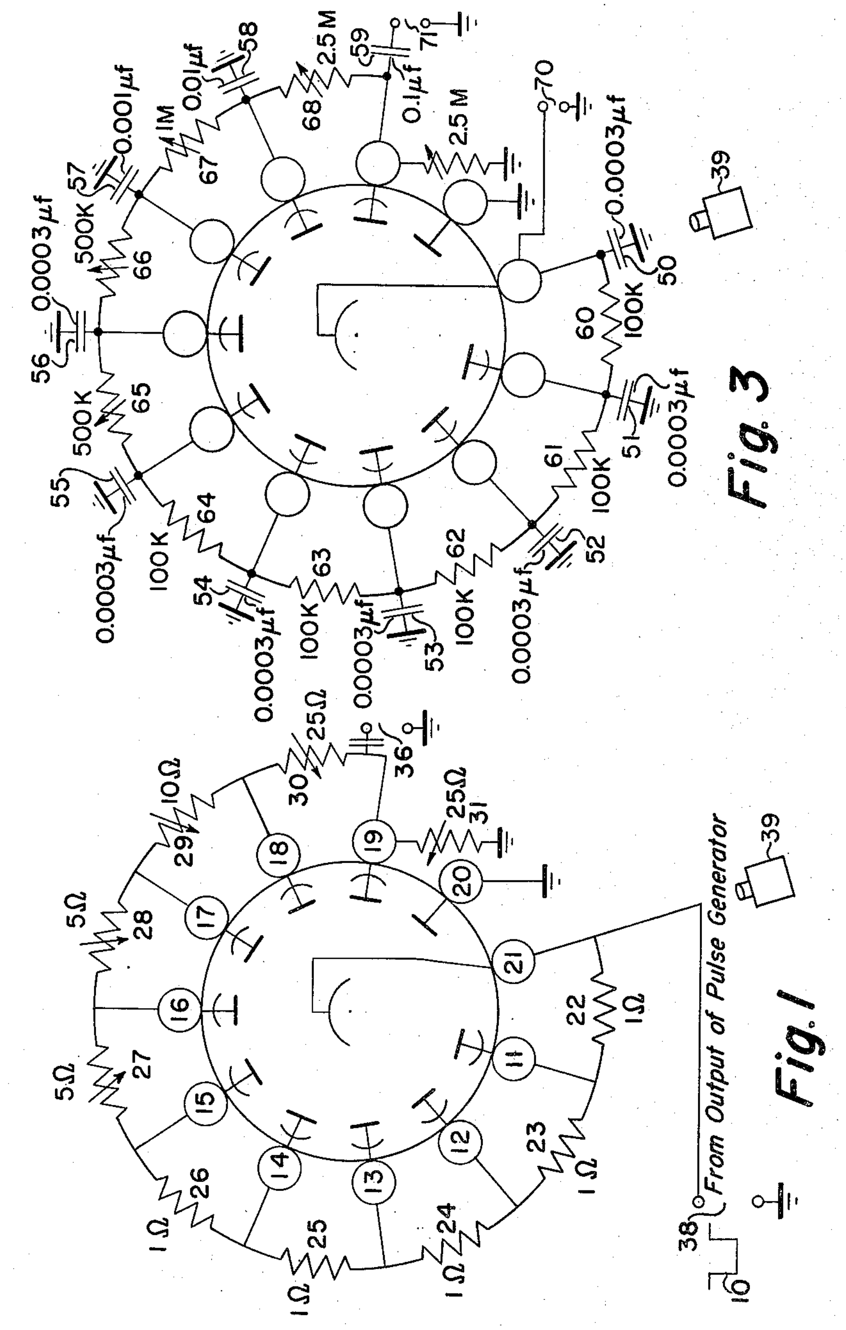
Figure 1 is a schematic view showing a photo-multiplier tube used as the oscillator tube and the necessary electrical connections whereby the tube will generate trains of oscillations.
Figure 3 is another embodiment of the invention.

Referring to Figure 1, a practical embodiment of the present invention is shown. This embodiment utilizes a photo-multiplier tube and thereby eliminates the necessity for heating means for the cathode. The photo-multiplier tube in the example shown is a conventional tube such as, for example, R. C. A. type 931-A, and comprises a photo cathode 21, secondary electron emitting dynodes 11—19 and an anode 20. In accordance with the present invention the cathode is connected to the first dynode by means of resistor 22. Adjacent dynodes are connected to each other thru resistors 23—30 respectively. Resistors 22—26 are of similar low value and resistors 27—30 are of higher ohmage and adjustable in value to permit optimizing the oscillatory performance of the device. Dynode 19 is connected to a unipotential plane or ground through an adjustable resistor 31. The photo-multiplier tube is preferably operated with the cathode subjected to high voltage negative pulses, and thus the dynodes are excited with incrementally decreasing negative potentials. The anode 20 is grounded. Input terminals 38 are provided between the cathode 21 and ground and output terminals 36 are provided between the last dynode 19 and ground.

When a negative impulse 10 is impressed on the cathode 21, the device of this invention generates a train of radio frequency oscillations having a frequency for the embodiment shown of about 250 megacycles with current amplitudes having a peak value in the neighborhood of 40 amperes.

An example of operation for this device is as follows: A negative impulse of between 4500 to 10,000 volts in magnitude and having a duration of about 0.25 microsecond in length is impressed between the cathode and ground. Resistors 27—31 are of value below critical damping and selectively increased in value so that the corresponding potentials increase from about 100 volts across resistor 27 to about 2,000 volts across resistor 31.

A practical set of values for the components of the device are shown in Figure 1, although it is understood that the values of the parts can be varied in accordance with the type tube, the amplitude of the input pulse and the desired output power.

Figure 2:
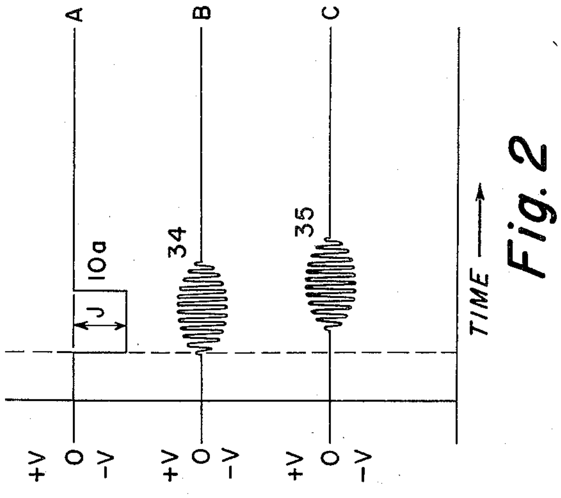
Figure 2 is a graph showing the time relationship between the actuating pulse and the output oscillations.

The present device provides an oscillator having several degrees of flexibility. For example, if energy from light source 39 illuminates the photo cathode continuously output oscillations are generated almost instantaneously after the leading edge of the input pulse 10 is impressed on the cathode 21. This relationship is illustrated in Figure 2 wherein negative pulse 10 is shown on a time scale which is the same for all the charts in this figure. It is seen that the oscillatory train 34 of chart B builds up quickly from the instant of impression on the cathode of the leading edge of the negative pulse 10A. It is noted that the duration of the oscillatory train is somewhat longer than the duration of the input pulse.

Considerable flexibility in the operation of the device is possible by selecting the time relationships between the impression of the input pulse on the cathode and the instant of illumination of the cathode. For example, chart C of Figure 2 shows that the oscillatory train 35 may be delayed a selected interval by illuminating the cathode with light source 39 after a selected lapse of time after the instant pulse 10 is impressed on the cathode.

Another embodiment which falls within the scope of the present invention is shown in Figure 3. In this embodiment a plurality of capacitors 50—59 are provided. One each of these capacitors couples a corresponding dynode to ground thereby completing the oscillatory path independent of the resistors.

The resistors 60—68 are of a value above the critical value and very much greater than the embodiment of Figure 1. It follows that the provision of the capacitors can result in increasing the length of the oscillatory train depending on the capacitance chosen.

In this embodiment, the oscillatory train is not initiated by a voltage pulse, but solely by a light pulse from the light source 39. In this instance, the voltage applied at input terminals 70 is a steady voltage from a low current source. The energy which appears in the resulting oscillation is stored in and supplied by capacitors 50—59.

Figure 4:
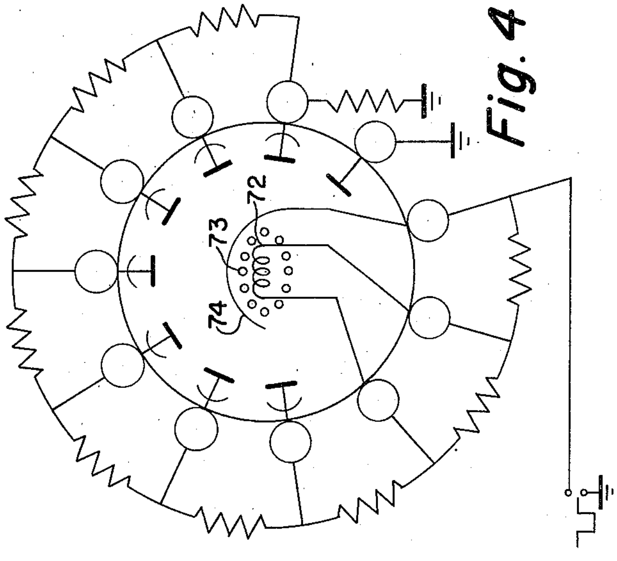
Figure 4 is a schematic view showing a thermionic cathode multidynode tube as the oscillator tube and the necessary electrical connections whereby the tube will originate and sustain pulsed oscillations.

Although the embodiments shown in Figures 1 and 3 make use of photo-multiplier tubes with the resulting advantage of the omission of cathode heater requirements, it is apparent that conventional heater cathodes may be utilized as shown in Figure 4. The utilization of conventional heater-type electron multiplier tube eliminates the need for a source of illumination for the cathode. The multiplier tube of Figure 4 is shown having a filament 72 to supply the necessary initial electrons; flexibility is achieved in the operation of the device by the use of a control grid 73. Shield 74 is present in the conventional manner and is for the purpose of preventing electrons from passing to any of the dynodes except the first dynode. The output oscillatory train can be controlled in time by the provision of a cut-off bias potential on the grid and any suitable switch means for removing the bias. The external circuitry can be the same as Figure 1 as shown or can be as Figure 3, whichever is desired.

Figure 5:
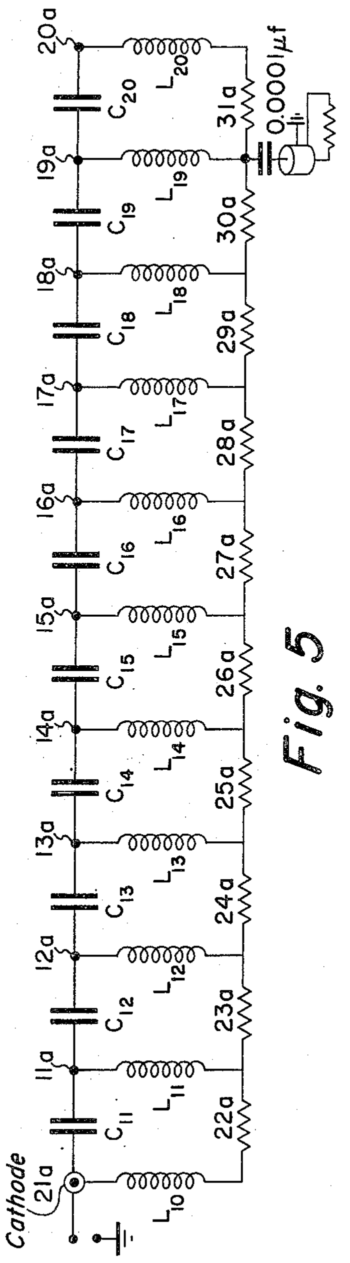
Figure 5 is an electrical equivalent representation of Figure 1.

Although it cannot be asserted with certainty that the exact operation of the invention is known, it is believed that it is a transit-time oscillatory of the secondary emission class. Figure 5 is an equivalent circuit valid for the purpose of explaining its operation. This circuit is considered equivalent to the device of Figure 1. The junction marked 21*a* corresponds to the cathode. The points marked 11*a* to 19*a* correspond to the dynodes, and the junction marked 20*a* corresponds to the anode. Capacitors $C_{11}$ to $C_{19}$ are representative of the inter-electrode capacitors between each corresponding pair of dynodes. Capacitance $C_{20}$ represents the inter-electrode capacitors between the last dynode and anode 20*a*. Inductances $L_{10}$ to $L_{20}$ represent the inductance of the respective electrode leads. Resistances 22*a* to 30*a* represent the resistors 22 to 30 of Figure 1 which connect respective adjacent pairs of dynodes. Resistance 31*a* of Figure 5 represents resistor 31 of Figure 1. It follows from the foregoing that a network including resistances, inductances, and capacitors is provided which is quite complex but which resonates at a frequency determined by the constants of the various components.

To explain the initiation of oscillations, it is assumed that the initial multiplied electron current leaves the last dynode 19*a* in a sufficiently short time to cause a small voltage $e$ to appear across inductance $L_{19}$. Since the entire structure is closely coupled electrically by capacities $C_{11}$—$C_{20}$, the voltage $e$ will appear across earlier dynodes, modulating the electron current at a lower current level and at an earlier time with respect to dynode 19*a*. If the electron transit time is favorable, the modulated current, now amplified upon reaching 19*a*, can reinforce the original voltage disturbance $e$ at 19*a*. In this fashion the tube is regenerative.

The tube can also sustain oscillations after the light source or filament source has been turned off. In this case it is assumed that the oscillation current has become sufficiently large between dynodes 18*a* and 19*a* to momentarily reverse the polarity of these stages. The secondary electrons from dynode 19 then partially return to 18*a* and then to 19*a* and so on. The transit time of the electrons between 18*a* and 19*a* must of course correspond to a half cycle of the resonance frequency.

An equivalent electrical circuit for Figure 3 would be similar to Figure 5 except that capacitors 50 to 58 of Figure 3 would replace resistors 22*a* to 30*a*. Since the dynode connecting resistors of Figure 3 are very much larger than those of Figure 1, it is understood that their function is to charge the capacitors 50 to 58.

Although the preferred embodiments have been illustrated, it is understood that many other circuit combinations are possible. For example, external inductance could be added to the circuit of Figures 1, 3, or 4 to change the resonant frequency. The resistor values given, though typical, can be different as can the capacitors of Figure 3. Other photo-multipliers than the type mentioned can be used. It is further understood that when a different photo-multiplier is substituted for one in operation, it may be necessary to alter the adjustments of the variable resistors to achieve optimum oscillatory results.

What is claimed is:

1. An apparatus for producing trains of oscillations comprising an electron multiplier tube having a cathode, a plurality of dynodes and an anode, a network comprising a plurality of resistors serially connected and one each respectively connecting the first dynode to the cathode and connecting each adjacent pair of dynodes, and connecting the last dynode to ground, a first plurality of said resistors adjacent the dynode to cathode end of the network being of substantially uniform value and substantially lower in value than the last dynode to ground resistor, a second plurality of said resistors having uniform value and each having a value substantially equal to the total resistance of the first plurality, a third value of resistor having a value substantially equal to the total value of said second plurality, and a last plurality of resistors each having a value substantially equal to the total value of the first and second pluralities and the third value resistor, input terminal means coupled between said cathode and ground, and output terminal means coupled to the last dynode and ground.

2. The device of claim 1 in which the resistors are of lower than critical damping value.

3. The device of claim 1 in which the cathode is a photo cathode, means for impressing negative potentials of respectively decreasing value on said cathode, dynodes and anode, and including means for pulsed illumination of said cathode.

4. The device of claim 1 including a source of negative impulses coupled to said input terminals to cause the generation in said device of trains of oscillations.

5. A device for producing trains of high frequency electrical oscillations comprising an electron multiplier tube having a cathode, a plurality of dynodes including a first and a last dynode, and an anode; a plurality of means for resistively coupling the first dynode to the cathode, for resistively coupling together each adjacent pair of dynodes and for resistively coupling the last dynode to ground; means connecting the anode to ground, groups of each of adjacent ones of said means for resistively coupling the first dynode to the cathode, the pairs of dynodes together and the last dynode to ground increasing in value by increments relative to each other, means for impressing a unidirectional negative input impulse on said cathode, and output means coupled to said last dynode, whereby an input unidirectional negative impulse impressed on said cathode causes said device to deliver a train of oscillations at said output means.

6. The device of claim 5 in which said electron multiplier tube cathode is a photo cathode.

7. The device of claim 5 having illumination excitation means for exciting said cathode, and means for controlling the instant of initiation of said illumination excitation means.

References Cited in the file of this patent

UNITED STATES PATENTS

| | | |
|---|---|---|
| 2,432,681 | Rasley | Dec. 16, 1947 |
| 2,457,747 | Sweet | Dec. 28, 1948 |
| 2,711,486 | Smythe | June 21, 1955 |
| 2,728,863 | Goodyear | Dec. 27, 1955 |
| 2,743,374 | McCreary | Apr. 24, 1956 |